Figure 1:
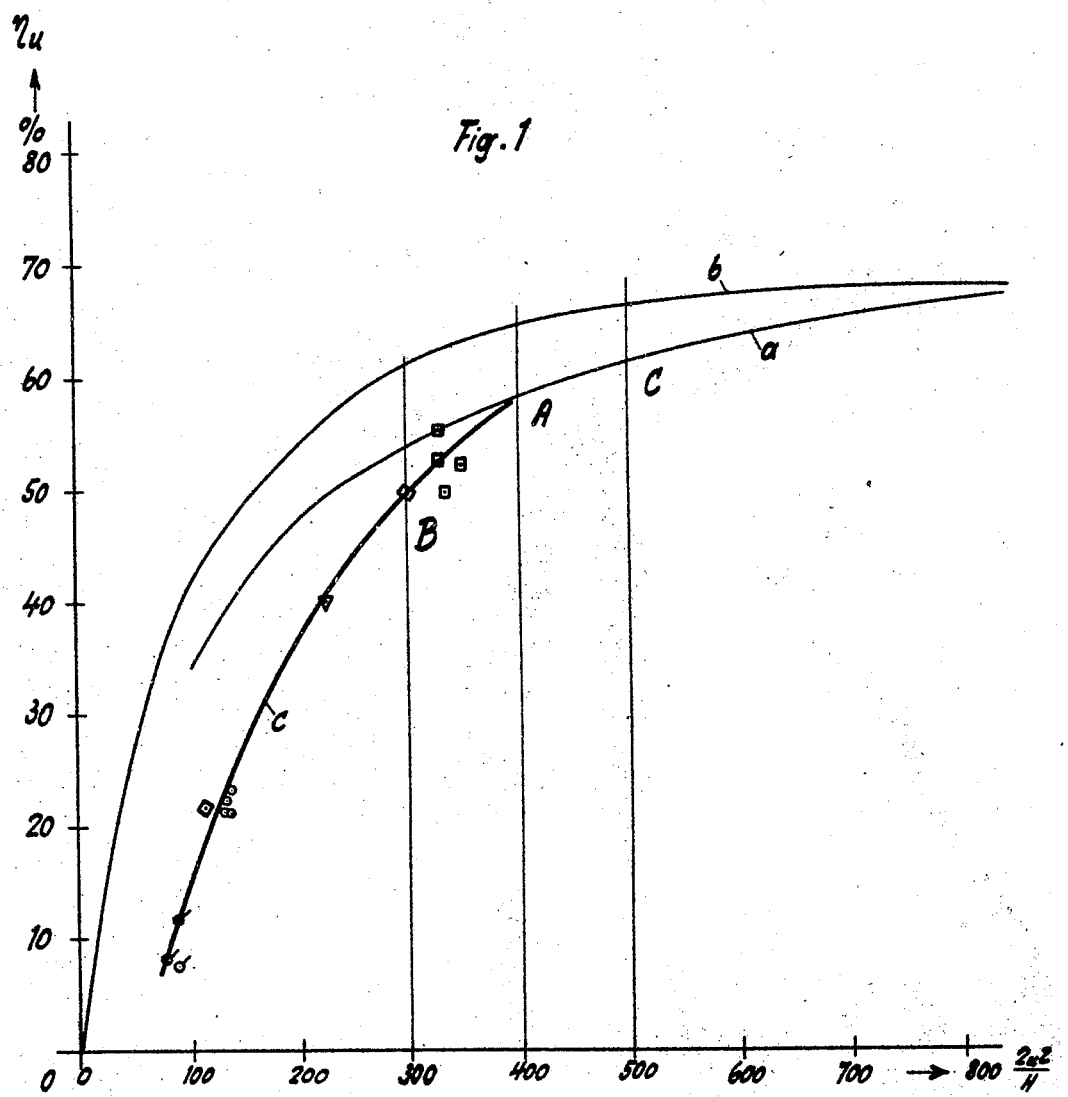

Patented Jan. 12, 1943

2,307,789

UNITED STATES PATENT OFFICE 2,307,789

PROCESS RELATING TO THE OPERATION OF EXPLOSION TURBINES

Hans Holzwarth, Dusseldorf, Germany, assignor to Holzwarth Gas Turbine Co., San Francisco, Calif.

Application August 30, 1940, Serial No. 354,822
In Germany September 5, 1939

2 Claims. (Cl. 60—41)

It is a well known fact in the field of turbine construction that the efficiency of the vanes of a turbine depends to a very considerable extent on the ratio of the peripheral velocity of the vanes to the velocity at which the motive fluid strikes the vanes.

This dependency was mathematically determined a long time ago, and as a basis for the average value of the peripheral velocity to the velocity of the motive fluid, the so-called Parsons figure has been introduced which represents the sum of the square of the peripheral velocity in relation to the total heat drop and which is therefore about proportionally equal to the square of the average ratio of the peripheral velocity to the velocity of the motive fluid. These relations naturally received due consideration in the construction of explosion turbines from the very beginning. However, there are limits to choosing any velocity of the explosion gases because the explosion temperature must be reduced by means of expansion of the explosion gases. This is necessary to avoid exposing the vanes to too high a temperature. The degree of the expansion necessitates also a fixed minimum velocity of the explosion gases. On the other hand, however, the peripheral velocity is restricted to safeguard the stability of the material, especially in view of the high temperatures. These factors apply to the initial stage of expansion and cannot for this reason be improved beyond a certain favorable ratio by a subdivision in pressure stages as in the case of steam turbines, because the first stage must have a minimum expansion.

The choice of the ratio of the peripheral velocity to the velocity of the explosion gases has, in the case of explosion turbines, always been based on a conflict between the endeavor to obtain as favorable an efficiency of the vanes as possible and a satisfactory stability of the vanes. In this connection, it must be considered that in the case of explosion turbines, the explosion gases have a maximum of pressure and temperature at the very moment when the discharge of an explosion chamber begins and that for this reason a maximum of velocity would be obtained at the first moment. It is possible to determine on the basis of the course of the expansion the law according to which the velocity of the explosion gases decreases during the process. According to this determination, the ratio of the peripheral velocity to the velocity of the explosion gases approaches the theoretically optimum value in proportion to the decrease in the velocity of the explosion gases. It was logically necessary to start on the supposition that a much more favorable average value over the whole period of discharge of an explosion chamber has an essential influence rather than the relatively unfavorable ratio of the peripheral velocity to the velocity of the explosion gases at the beginning of a discharge of an explosion chamber when the gas velocity is very high.

Graphic and mathematical methods have also been developed for the purposes of determining this effective average value, and it has thus been possible to determine the course of the peripheral efficiency of the vanes for different degrees of expansion. Giving, on the basis of the curve thus determined, consideration to the efficiency of Curtis wheels for internal combustion turbines, it was found that, with reference to the initial heat drop, the efficiency of the turbine down to a ratio of the circumferential velocity $u$ to the explosion gas velocity $c$ of 0.11, that is $u/c=0.11$, was to be in excess of 50 per cent. Considerations of this kind were also made and confirmed by well-known experts in the field of turbine construction and in thermo-dynamics. In the early periods of constructing explosion turbines it was a general aim to keep the turbines as simple as possible. For this reason constructors refrained in particular from cooling the nozzles and vanes. By decreasing the temperature of the explosion gases to a temperature which could be borne by uncooled vanes and nozzles, it was believed that, on the basis of the discoveries described above, there was still a sufficient efficiency of the vanes for the turbines wheels.

However, in the case of explosion turbines it is impossible to measure the efficiency of the vanes in the same way as, for instance, in the case of steam turbines, to the vanes of which the steam is conducted at a given constant pressure and a certain constant temperature. In the case of explosion engines both pressure and temperature of the explosion gases cannot be observed during the process of expansion with the aid of useful and practical measuring methods. It was therefore impossible to verify the correctness of the theory raised by the first experts in the field, and consequently there was also no reason to doubt the correctness of this theory when measuring tests on explosion turbines resulted in determining a total efficiency which was considerably below the expected value. Important sources of losses were found outside of the conversion of energy in the vanes and considerable improvement in the total efficiency was obtained by reducing these losses. Even if the efciency of the vanes had not been accurately determined on the basis of the favorable course of the efficiency which had been theoretically determined, but had rather adapted itself in a greater measure to the course of the total efficiency which was known from steam turbine construction, there would have been no essential reason for accepting the difficulties which are connected with an increase in temperature as a result of a lower degree of expansion of the gases from the explosion chamber. The importance of the efficiency of the vanes with reference to the total efficiency of an explosion turbine appeared to be negligible compared to the other losses to such an extent for constructional reasons that the ratio of the peripheral velocity to the explosion gas velocity was temporarily even made less favorable.

Despite these adverse factors the subsequent development of explosion turbines, as far as the other constructional details are concerned, resulted in further basic progress in the improvement of the total efficiency. However, the total efficiency thus obtained remained below a value which should have been reached as a minimum prior to the introduction of this new type of engine.

It is here where the present invention has its start:

According to this invention, it is found that contrary to all theoretical discoveries and former practical experience, the efficiency of the vanes of explosion turbines is, in the field hitherto covered, far below the expected value, and that an improvement in the ratio of the peripheral velocity to the velocity of the fire gases in the direction of the theoretically optimum value must result in a marked increase in efficiency. According to the present invention, a basis for determining the efficiency and durability of the vanes is created by choosing, as a referential quantity, the square of the peripheral velocity $u$ in relation to the initial heat drop H, i. e., the heat drop of the gases at the moment when the explosion chamber is opened, in relation to the pressure in the wheel casing, that is, the back pressure. This comparative figure is $$\frac{2u^2}{H}$$

The method by which this figure was obtained will be the subject of a special discussion in the following lines.

According to the proposals of the present invention this figure must represent a greater value than a fixed value which still remains to be explained. It should preferably remain within the limits mentioned hereinafter. However, it was impossible to prove this intuitive discovery by means of tests. In order to be able to make such tests, a fundamental change in the prevailing type of explosion turbines was indispensable. For the purpose of keeping the above-mentioned figure above a value which was recognized to represent the limit, it was necessary, on the one hand, to obtain a very high circumferential velocity and, on the other, to keep the heat drop H low, as a result of which the final temperature after the expansion, i. e., the temperature in the wheel casing, will be very high. With the use of uncooled turbine wheels and nozzles, it was impossible to make such tests. In order to verify the inventor's intuitive discovery, it was at first necessary to construct, though at heavy financial cost, a type of turbine with effectively cooled nozzles and wheel. The construction of such a type encountered considerable difficulties. Extensive research and tests were necessary before a type of explosion turbine with a figure above the required limit of value was capable of being operated for the sole purpose of making successful measurements.

After having reached this end, it was found that the efficiency of the turbine had improved to an extent confirming the fact that a normal efficiency of the vanes had been obtained. Subsequent comparisons between tests of older types and up to date constructions resulted in determining, with sufficient accuracy, the individual sources of losses in the rank of their importance. Now it could be actually proven that the efficiency of the vanes takes a course which is essentially different from that which had been expected.

Figure 2:
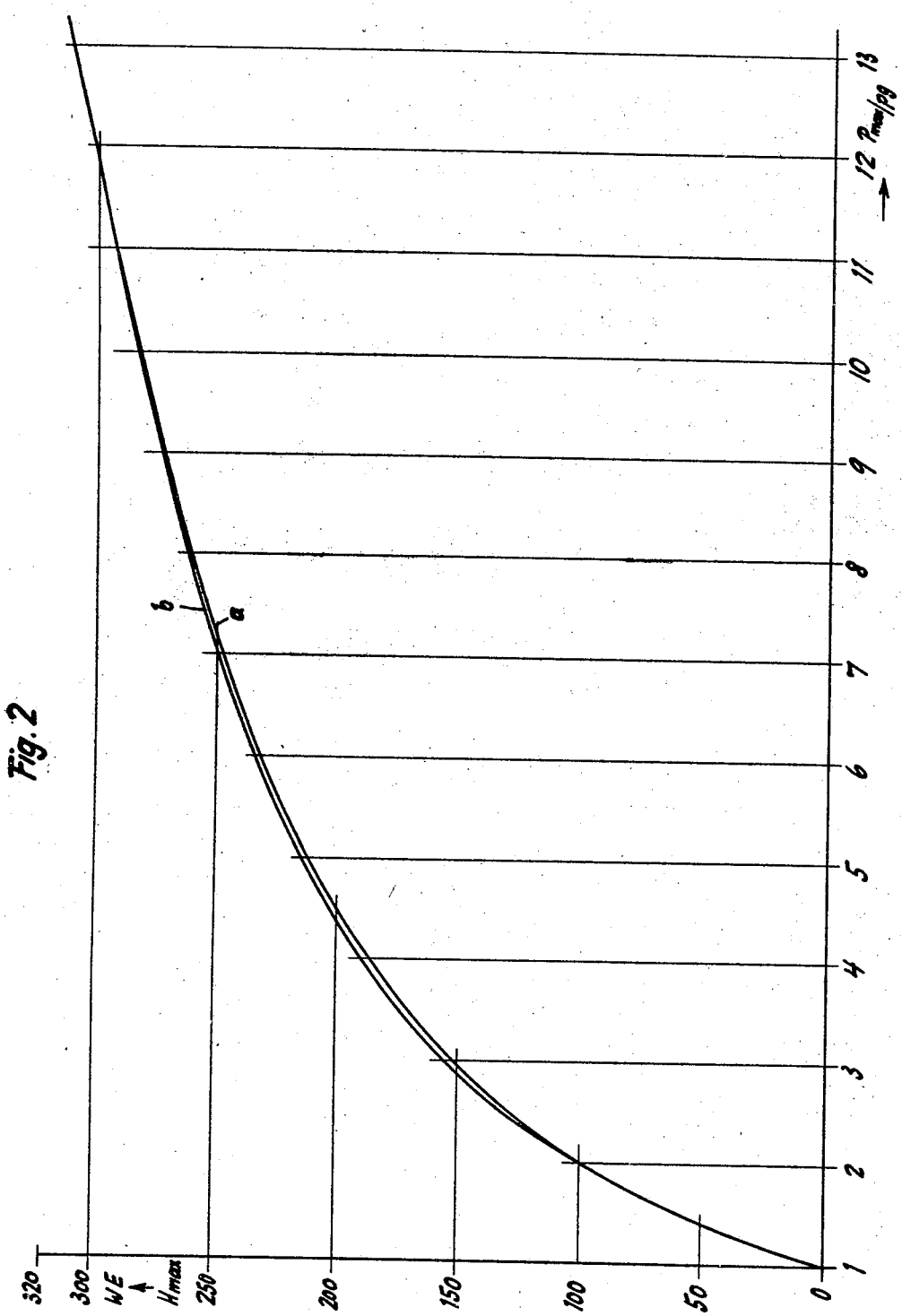
Figure 3:
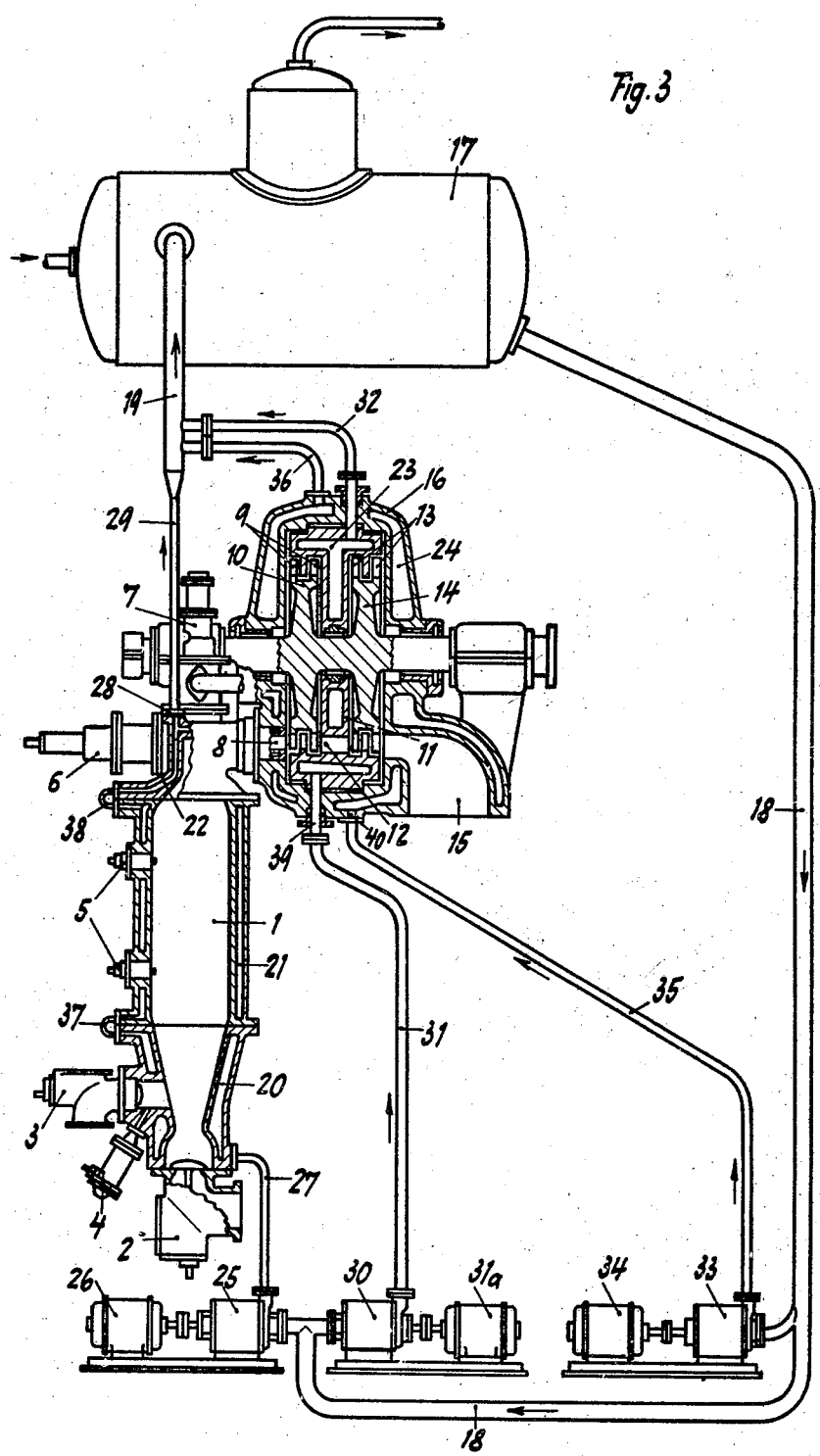

The invention will be further explained with the aid of the accompanying drawings, wherein Fig. 1 shows the relationship between the efficiency and the ratio $$\frac{2u^2}{H}$$

for different types of turbines; Fig. 2 shows curves indicating the relationship between the heat drop and the pressure ratio; while Fig. 3 illustrates an explosion turbine plant embodying the present invention.

In Fig. 1, curve $a$ represents a well known curve showing the efficiency of two-rim Curtis wheels, according to illustration No. 219 in the book entitled "Dampf and Gasturbine" by Stodola (Publisher Jul. Springer, Berlin, 1922, 5th ed.). This is curve $b_5$, the ratio $u/c_1$ of illustration No. 219 by Stodola having been converted, by giving consideration to a loss of velocity in the nozzles of 5 per cent, for application to the figure $$\frac{2u^2}{H}$$

Curve $b$ shows the course of efficiency of a two-rim Curtis wheel for internal combustion turbines, giving at the same time consideration to the decrease in the explosion gas velocity during the expansion, according to observations made in 1922. The the course of curve $a$ is much more favorable than that of curve $b$ in the case of low values, is clearly evident. Curve $c$ shows the course of the curve of efficiency of the first Curtis wheel of explosion turbines. This curve was subsequently obtained by comparative observation of the numerous measurements on various turbines and approaches, with fair accuracy, actual conditions. Curve $c$ could not be obtained from tests of individual machines, since in view of the complicated process of explosion it was impossible to determine the individual losses.

The gradual determination by experience of the individual quantities of loss was possible only at the time when these quantities underwent a fundamental change due to constructional improvements and changes in the process of explosion.

The most difficult task in this field was the determination of the influence of the aforementioned figure on the efficiency of the vanes.

To achieve this end it was necessary, as has already been stated, to proceed to the construction of fundamentally new types of wheels and nozzles, that is to say, cooled types the construction of which required considerable funds and time. Such expenditures, however, could be justified only after having gained the intuitive belief that such complicated types constitute an essential and rapid progress making up for heavy expenditures of money and time.

As is shown by the course of curve c, this curve actually begins to fall off considerably from curve a below point A. This deviation begins to assume such proportions below point B that a useful total efficiency is no longer to be reckoned with. Since point B may be exceeded only by making use of cooled vanes and nozzle, proof had been furnished to the effect that the construction of serviceable explosion turbines without cooling their vanes and nozzles is impossible.

Up to the present time it had not been possible to determine accurately the causes of this striking and unexpected attitude of the vanes of explosion turbines. This may chiefly be explained by the fact that the law governing the expansion in the explosion chamber is different from what must be supposed on the basis of theoretic observations, and that, in particular, the losses of heat at the beginning of the expansion in the explosion chamber and especially beyond the explosion chamber are many times greater than the losses of heat during the further course of the expansion. Losses caused by percussion or whirling or phenomena of deviation may also have an adverse effect. It is of decisive importance in any case that the unexpected decrease in efficiency in the case of a low value of the figure (which decrease, according to intuitive belief, was bound to occur) actually takes place, and that by means of improving the figure the possibility of a marked increase in the efficiency of an explosion engine could be confirmed after having surmounted all obstacles.

The drawing contains all points which were subsequently determined on the basis of tests and which account for the insertion of curve c as indicated. Each separate illustration represents a series of points having reference to a certain type of explosion turbines.

A close examination of the conditions as described shows that the course of curve c is a completely unexpected one. In this connection emphasis must be laid on the difficulties in determining the efficiency of the vanes of an explosion turbine. For the mere purpose of determining the initial heat drop which is made available in the turbine wheel, all of the factors having an influence on the output must be known such as the caloric value of the gas mixture, temperature prior to the explosion, efficiency of explosion, loss of heat in the fore chamber of the nozzles, losses caused by whirls in the nozzles and vanes, losses of heat in the nozzles and vanes, losses of heat to the wheel and the housing, losses by ventilation, losses by throttling, and so forth. The loss of heat in the vanes is thus only a small fraction of the total losses. Attention should also be paid to the fact that even Stodola and Schüle have not been able to determine, though they have left no stone unturned and made most accurate measurements, that the efficiency of the vanes was actually that far below the expected value. There was therefore the necessity of an intuitive belief on the part of the inventor in order to realize, contrary to the opinion of all experts, that the efficiency of the vanes is the last great source of loss, and, in the face of all constructional difficulties, to force the improvement of the figure without being able at first to prove in some way the correctness of the intuitive belief.

As far as the determination of the figure curve is concerned, the following may be said:

It has already been stated that in view of the complicated nature of the process in explosion turbines it is extremely difficult to determine with complete accuracy both numerically and according to their importance the losses arising during the entire process. Certain losses are actually larger than has ever been known. As a result of the large number of existing fundamentally different types of engines and as a result of numerous tests under various conditions, experts gradually succeeded in gaining a general view of the influence of the individual quantities of losses under varying conditions. Today it is possible to describe and classify with fair accuracy the losses which were found during former tests in all types hitherto constructed.

As a result it is now possible to determine, with sufficient accuracy, the actual efficiency of the vanes of types of explosion turbines thus far constructed and tried. This subsequent research resulted in determining the points forming a basis for the determination of curve c and made it possible to gain an idea of the course of the efficiency of the vanes with reference to its dependency of the chosen figure.

The classification of the losses the last link of which are those found in the vanes cannot be proven with mathematic accuracy within limits mathematically fixed. It is also possible that this classification may be slightly changed as a result of further experience. It must be added that the maximum and minimum value of the figure will only hold good as long as the figure is determined by the method described herein. An essential change in the method of determination and, for instance, likewise a considerable change in the quantities of losses and the distribution of the losses in the theoretical calculations would shift to a considerable extent the limits within which the efficiency of the vanes at an admissible temperature is still satisfactory.

In order to remove these difficulties it is proposed that in determining the initial heat drop on which the figure is based resort be taken to a method of approximation which was already employed when figure curves were drawn for the first time. A simplification of the method of determining the heat drop which must be taken as a basis for the figure curve may be effected by establishing the heat drop in taking the heat drop from the indicator diagram by means of determining the maximum pressure and the average counterpressure and at the same time choosing a temperature of 1,500 degrees centigrade as the initial temperature of the expansion. In drawing the figure curve this theory of approximation was not retained since it became evident that as a result of cold cooling, that is, cooling by means of a relatively cold cooling agent, as well as the use of large nozzle fore chambers and small explosion chambers in the case of older types of explosion turbines the temperature at the beginning of the expansion was essentially below 1,500 degrees of centigrade. Under these circumstances it was absolutely necessary to determine as accurately as possible the initial heat drop of all types of turbines thus far constructed. This could be effected by means of thermodynamic examination of the processes based, with reference to the losses, on the theoretical data which have meanwhile become available.

It is by this method that the value of the new figure curve has increased considerably. The examination of the explosion process in gas turbines with hot cooling, that is, with a method of cooling in which the cooling agent is caused to reach its boiling point, or approximately such point, while it is maintained under pressure, with reference to a 2,000 kilowatt trial turbine and another unit for 5,000 kilowatts, shows that a temperature of at least 1,500 degrees centigrade at the beginning of the expansion must be taken into consideration. It is therefore proposed to make use of the curve given in Fig. 2 in order to determine the figure for turbines to be examined for the purpose of finding out whether they make use of the present invention. The curve contains data showing the heat drop of the various gaseous, liquid and solid fuels under a pressure ration of 0–14 on the basis of the Pflam entropy diagram. These curves apply to an initial temperature of the explosion gases of 1,500 degrees centigrade exactly, within the limit of a maximum absolute pressure of from 20 to 50 atmospheres. In practice, however, a much greater pressure range is likely to be covered. Curve $a$ applies to blast furnace gas and similar gas with the usual air content of 15 per cent in the explosion gases, and curve $b$ to gasoline, benzol, gas oil, coking plant gas, carburetted hydrogen, and hard coal gas with an air content of 40 per cent in the explosion gases. The two curves deflect but slightly from one another. It is proposed that the figure for explosion turbines be determined as follows:

The maximum explosion pressure and the average counterpressure of the first expansion, i. e., the average pressure in the wheel casing is determined on the basis of the indicator diagram.

With the use of the ratio between these two pressures the maximum heat drop is taken from the curve of Figure 2.

The figure is then obtained by means of a division of the double square of the medium peripheral velocity of the first turbine wheel by the initial heat drop thus determined.

In the future, explosion turbines will no doubt be developed in such a way as to make it possible for the wheels to endure as high gas temperatures as possible. This development may likewise bring about a further increase in the maximum temperature of the explosion gases. The gas temperatures will probably also increase with the construction of larger units, especially larger combustion chambers, whereby the losses of heat will be decreased. With temperature increasing at the beginning of the expansion, there is also an increase in the heat drop under the same expansion ratio, that is to say, the heat drop determined at a temperature of 1900 degrees centigrade is smaller that the actual heat drop.

Fig. 3 shows an explosion turbine plant employing hot cooling and embodying the present invention. One of the explosion turbines is indicated at 1 and is provided with scavenging and a precharging air valve 2, a higher pressure air valve 3, a fuel inlet member 4, and spark plugs 5. After the explosion, the gases are discharged by opening of a hydraulically controlled outlet or nozzle valve 6, the gases then passing into a nozzle 8 by which they are directed against the blades 9 of the turbine wheel 10. The gases discharging from the blades 9 pass through a nozzle 12 within the separating wall 11 and then impinge the blades 13 of the turbine rotor 14. The exhausted gases escape at 15. When the pressure in the explosion chamber has dropped to approximately the back pressure on the turbine wheel 10, the nozzle valve 6 is closed and an auxiliary outlet valve 7 is opened to effect discharge of the residual explosion gases against a lower back pressure, the valve 2 being opened at such time to admit scavenging air.

The turbine casing is provided with a cooling jacket, as shown at 16, and the cooling agent is charged into a steam separator 17, from which the separated steam is delivered to a place of use, while the unevaporated cooling agent (preferably water) is fed from the separator by means of the line 18 to a series of pumps 25, 30 and 33, driven by the motors 26, 31a and 34, respectively. The pump 25 charges the cooling agent from the pipe 27 into the jacket 28 surrounding the inlet portion of the explosion chamber, the cooling agent traveling from the jacket 20 into the jacket 21 about the main body of the explosion chamber and into the jacket 22 about the outlet end of the chamber, the cooling agent passing through the vertically arranged jackets in series by way of the connections 37, 38. At the discharge outlet 29 the heated cooling agent passes by way of the conduit 29 and collecting pipe 19 into the steam separator 17. In similar fashion, the pump 30 delivers a hot cooling agent from pipe 31 and the connection 39 into the central cooling space 23 of the intermediate wall 11, and passes thence through pipe 32 into collecting pipe 19. The pump 33 charges the hot cooling agent into the pipe 35 and by way of the connection 40 it enters the cooling space 24 of the jacket 16, the heated cooling agent which, like that in the other circuits, is under high pressure, leaving the cooling jacket at substantially the highest point thereof and flowing by way of the conduit 36 into collecting pipe 19.

I claim:

1. Process relating to the operation of explosion turbines the nozzles and vanes of which are cooled, which process is characterized by the fact that the peripheral velocity $u$ is increased to such an extent and the initial heat drop H given by the heat drop of the explosion gases at the moment of the first opening of the explosion chamber in relation to the pressure in the casing of the first turbine wheel is decreased to such an extent that the ratio $$\frac{2u^2}{H}$$

is greater than 300, $u$ being expressed in meters per second, and H in kilogram-calories per normal cubic meter of combustion gases (referred to 0° C. and 1.33 kg./cm.²).

2. Process according to claim 1, wherein the ratio $$\frac{2u^2}{H}$$

is between 300 and 500.

HANS HOLZWARTH.